US009060364B2

(12) United States Patent
Xing et al.

(10) Patent No.: US 9,060,364 B2
(45) Date of Patent: Jun. 16, 2015

(54) SCHEDULING METHOD AND DEVICE

(71) Applicant: HUAWEI TECHNOLOGIES CO., LTD., Shenzhen (CN)

(72) Inventors: Pingping Xing, Shanghai (CN); Yi Guo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 207 days.

(21) Appl. No.: 13/759,559

(22) Filed: Feb. 5, 2013

(65) Prior Publication Data

US 2013/0148638 A1 Jun. 13, 2013

Related U.S. Application Data

(63) Continuation of application No. PCT/CN2011/073882, filed on May 10, 2011.

(30) Foreign Application Priority Data

Aug. 16, 2010 (CN) .......................... 2010 1 0254226

(51) Int. Cl.
*H04J 3/00* (2006.01)
*H04W 72/04* (2009.01)
*H04W 72/12* (2009.01)
*H04W 16/14* (2009.01)
*H04W 72/08* (2009.01)

(52) U.S. Cl.
CPC .......... *H04W 72/0446* (2013.01); *H04W 16/14* (2013.01); *H04W 72/1215* (2013.01); *H04W 72/082* (2013.01)

(58) Field of Classification Search
None
See application file for complete search history.

(56) References Cited

U.S. PATENT DOCUMENTS

| 6,470,006 | B1 | 10/2002 | Moulsley ...................... 370/347 |
| 2008/0139200 | A1 | 6/2008 | Zhu et al. |
| 2008/0139212 | A1 | 6/2008 | Chen et al. |
| 2009/0061849 | A1 | 3/2009 | Yang et al. |
| 2009/0109939 | A1 | 4/2009 | Bhushan et al. |
| 2009/0213773 | A1 | 8/2009 | Yoon et al. ..................... 370/311 |
| 2009/0290560 | A1 | 11/2009 | Feng |
| 2010/0120446 | A1* | 5/2010 | Gaal ........................... 455/452.2 |
| 2010/0322287 | A1* | 12/2010 | Truong et al. ................. 375/133 |

(Continued)

FOREIGN PATENT DOCUMENTS

| CN | 101237670 A | 8/2008 |
| CN | 101558584 A | 10/2009 |

(Continued)

OTHER PUBLICATIONS

Chinese Search Report dated Aug. 27, 2013 in corresponding Chinese Application No. 201010254226.6.

(Continued)

*Primary Examiner* — Otis L Thompson, Jr.
(74) *Attorney, Agent, or Firm* — Staas & Halsey LLP

(57) ABSTRACT

The present invention discloses a scheduling method and a device, which may avoid a conflict between scheduling performed by a first system on a UE and using, by the UE, a second system on a frequency band adjacent to a frequency band of the first system, such as receiving or sending, by the UE, data or a message of the second system. In this way, the problem of mutual interference in message reception and transmission that are performed by the UE in two systems on adjacent frequency bands is solved.

21 Claims, 3 Drawing Sheets

(56) References Cited

U.S. PATENT DOCUMENTS

| | | | |
|---|---|---|---|
| 2011/0235612 A1 | 9/2011 | Abeta et al. | 370/329 |
| 2011/0242969 A1* | 10/2011 | Dayal et al. | 370/225 |
| 2011/0243047 A1* | 10/2011 | Dayal et al. | 370/311 |
| 2011/0280223 A1 | 11/2011 | Maeda et al. | 370/335 |
| 2011/0312288 A1* | 12/2011 | Fu et al. | 455/88 |
| 2012/0020231 A1* | 1/2012 | Chen et al. | 370/252 |
| 2012/0069766 A1* | 3/2012 | Fu et al. | 370/252 |
| 2012/0087341 A1* | 4/2012 | Jang et al. | 370/331 |
| 2012/0164948 A1* | 6/2012 | Narasimha et al. | 455/63.1 |
| 2012/0314680 A1* | 12/2012 | Kela | 370/329 |
| 2013/0021954 A1* | 1/2013 | Montojo et al. | 370/295 |
| 2013/0064155 A1* | 3/2013 | Sohrabi | 370/311 |
| 2013/0114548 A1* | 5/2013 | Banerjea | 370/329 |
| 2013/0194994 A1* | 8/2013 | Dayal et al. | 370/311 |
| 2013/0272260 A1* | 10/2013 | Bitran et al. | 370/329 |
| 2013/0279423 A1* | 10/2013 | Ahn et al. | 370/328 |
| 2013/0288742 A1* | 10/2013 | Yao et al. | 455/553.1 |
| 2014/0044110 A1* | 2/2014 | Banerjea | 370/336 |

FOREIGN PATENT DOCUMENTS

| | | |
|---|---|---|
| CN | 101595683 | 12/2009 |
| CN | 101605374 | 12/2009 |
| CN | 101938701 | 1/2011 |
| EP | 2034631 A1 | 3/2009 |
| EP | 2393330 | 12/2011 |
| JP | 2002-500848 | 1/2002 |
| JP | 2008-193438 | 8/2008 |
| JP | 2009-60250 | 3/2009 |
| WO | 2009/055619 | 4/2009 |
| WO | 2009/107969 A2 | 9/2009 |
| WO | 2010/073325 A1 | 7/2010 |
| WO | 2010/087172 A1 | 8/2010 |

OTHER PUBLICATIONS

Chinese Office Action mailed Sep. 4, 2013 in corresponding Chinese Application No. 201010254226.6.
LS on in-device coexistence interference, 3GPP TSG-RAN-WG4 Meeting #55, R4-102268, May 10-14, 2010 (1 pg.).
3GPP TS 36.300 V9.4.0, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), Jun. 2010, pp. 1-171.
3GPP TS 36.331 V8.10.0, $3^{rd}$ Generation Partnership Project; Technical Specification Group Radio Access Network; Evolved Universal Terrestrial Radio Access (E-UTRA); Radio Resource Control (RRC); Protocol specification (Release 8), Jun. 2010, pp. 1-211.
Discussion on In-device Coexistence Interference Avoidance, 3GPP TSG-RAN WG2 Meeting #70bis, R2-103644, Jun. 28-Jul. 2, 2010, pp. 1-3.
Written Opinion of the International Searching Authority, dated Aug. 18, 2011, in corresponding International Application No. PCT/CN2011/073882 (4 pp.).
Japanese Office Action issued Mar. 4, 2014, in corresponding Japanese Patent Application No. 2013-524338.
Extended European Search Report, dated Jul. 15, 2013, in corresponding European Application No. 11817699.9 (7 pp.).
International Search Report of Corresponding PCT Application PCT/CN2011/073882 mailed Aug. 18, 2011.
Japanese Office Action mailed Dec. 9, 2014 in corresponding Japanese Patent Application No. 2013-524338.

* cited by examiner

SCHEDULING METHOD AND DEVICE

CROSS-REFERENCE TO RELATED APPLICATIONS

This application is a continuation of International Application No. PCT/CN2011/073882, filed on 10 May 2011, which claims priority to Chinese Patent Application No. 201010254226.6, filed on 16 Aug. 2010, both of which are hereby incorporated by reference in their entireties.

TECHNICAL FIELD OF THE INVENTION

The present invention relates to the field of mobile communications, and in particular to a scheduling method and a device.

BACKGROUND OF THE INVENTION

In a communications system, a spectrum is divided into different frequency bands. For example, 40 available frequency bands are obtained through division in a Long Term Evolution (Long Term Evolution, LTE) system, where 777 MHz to 787 MHz is a frequency band with the sequence number of 13 (band 13 for short), 746 MHz to 756 MHz is a frequency band with the sequence number of 14 (band 14 for short), and 2300 MHz to 2400 MHz is a frequency band with the sequence number of 40 (band 40 for short). For another example, one of industrial, scientific, and medical frequency bands (ISM frequency bands) shared by each country is a frequency band from 2.4 GHz to 2.5 GHz (2.4 G frequency band for short). The frequency band is adjacent to the band 40 of the LTE system. Wireless networks such as a wireless local area network, Bluetooth, and ZigBee are all capable of working on the frequency band. For another example, a global positioning (Navigation Satellite Timing And Ranging Global Position System, GPS) system may work at 1575.42 MHz. The frequency band is adjacent to a harmonic of the band 13/band 14.

In the prior art, if a user equipment (User Equipment, UE) uses the LTE system on a certain frequency band and uses another system on a frequency band adjacent to the frequency band at the same time, sending a signal of the LTE system by the UE may interfere with the UE receiving a signal of the another system, and sending a signal of the another system by the UE may also interfere with the UE receiving a signal of the LTE system.

SUMMARY OF THE INVENTION

In one aspect of the present invention, a scheduling method is provided, including:

receiving, by a base station in a first system, a first indication sent by a user equipment UE, where the first indication indicates that interference exists between the first system and a second system;

generating, by the base station, temporary scheduling information, and sending the temporary scheduling information to the UE; and scheduling, by the base station, the UE according to the temporary scheduling information, where the time at which the base station schedules the UE according to the temporary scheduling information does not overlap the time at which the UE receives data from the second system.

In another aspect of the present invention, a scheduling method is provided, including:

sending, by a user equipment UE, a first indication and recommended scheduling information to a base station in a first system, where the first indication indicates that interference exists between the first system and a second system;

receiving, by the UE, an acknowledgment message sent by the base station; and accepting, by the UE, according to the recommended scheduling information, scheduling by the base station, and receiving data of the second system in a time segment in which the base station does not schedule the UE.

In another aspect of the present invention, an apparatus is provided. The apparatus is located in a first system and includes a receiving unit, a processing unit, and a sending unit, where:

the receiving unit is configured to receive a first indication sent by a UE, where the first indication indicates that interference exists between the first system and a second system;

the processing unit is configured to generate temporary scheduling information and schedule the UE according to the temporary scheduling information;

the sending unit is configured to send the temporary scheduling information to the UE; and the time at which the processing unit schedules the UE according to the temporary scheduling information does not overlap the time at which the UE receives data from the second system.

In another aspect of the present invention, an apparatus is provided, including a transceiving unit and an execution unit, where:

the transceiving unit is configured to send a first indication and recommended scheduling information to a base station in a first system, where the first indication indicates that interference exists between the first system and a second system; and the transceiving unit is further configured to receive an acknowledgment message sent by the base station; and the execution unit 520 is configured to accept, according to the recommended scheduling information, scheduling by the base station, and receive data of the second system in a time segment in which the base station does not schedule the UE.

By applying the method or the device according to the embodiments of the present invention, a conflict between scheduling performed by the first system on the UE and using, by the UE, the second system on a frequency band adjacent to a frequency band of the first system, such as receiving or sending, by the UE, data or a message of the second system, can be avoided. In this way, the problem of mutual interference in message reception and transmission that are performed by the UE in two systems on adjacent frequency bands is solved.

DETAILED DESCRIPTION OF THE EMBODIMENTS

The following clearly describes the technical solutions of the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

For ease of description, a UE and a base station in an LTE system are taken as examples in the embodiments of the present invention. However, names of a system and a device should not be construed as a limitation on the solutions. Practically, a UE in the embodiments of the present invention may be any device that accepts scheduling by a device in a first system and is not limited to a device that can be used by a user, and a base station may be any device that has a scheduling function or implements a scheduling function in the first system and is not limited to a base station. In addition, a first system in the embodiments of the present invention may be any scheduling-based system such as an LTE system and an LTE+ system. As long as interference exists between a frequency band of the system and that of another system, a method provided in the embodiments of the present invention can be used to solve the problem of mutual interference in message reception and transmission that are performed by a scheduled device in the system.

Figure 1:
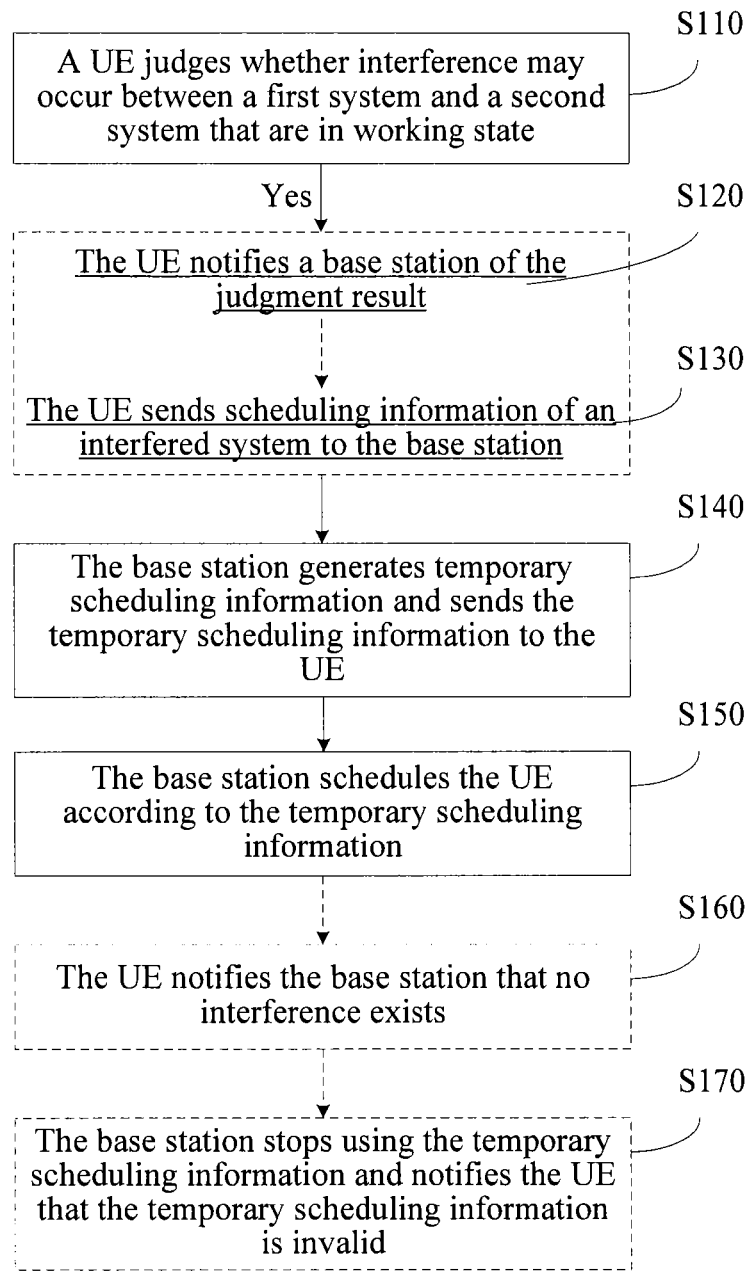
FIG. 1 is a schematic diagram of a scheduling method according to an embodiment of the present invention.

As shown in FIG. 1, an embodiment of the present invention provides a method. This embodiment includes the following steps:

S110. A UE may judge whether interference may occur between a first system and a second system that are in a working state. If the judgment result is that interference exists, perform S120.

Optionally, if the second system starts to be used or the second system needs to be used (at this moment, the second system has not been used), the UE performs the judgment in S110. For example, the first system is an LTE system. A command, for positioning by using a GPS system, received by the UE indicates that the GPS system needs to be used. In this case, the UE judges whether interference may occur between the LTE system and the GPS system. For another example, the first system is a wireless local area network (Wireless Local Area Network, WLAN) system. When the UE starts to use the LTE system, the UE judges whether interference may occur between the WLAN system and the LTE system.

Optionally, the UE judges whether interference exists between the LTE system and the second system by judging, based on comparison between the two frequencies, whether a working frequency band of the LTE system is adjacent to a frequency band used by the second system, for example, whether the span between the two frequency bands is less than or equal to a threshold (such as 100 MHz). If the two frequency bands are adjacent to each other, the judgment result is that interference occurs between the first system and the second system. In this situation, the first system and the second system may be called interference systems for each other.

For example, harmonics of both the band 13 and the band 14 of the LTE system are adjacent to a frequency band used by the GPS system. Therefore, the LTE band 13 may be called an interference system of the GPS system, and the LTE band 14 may also be called an interference system of the GPS system. Alternatively, the GPS system is a system interfered with by the LTE band 13 or the LTE band 14, which is called an interfered system for short. For another example, the band 40 of the LTE system is adjacent to a frequency band used by the WLAN system in an ISM system and a frequency band used by Bluetooth (BlueTooth, BT) in the ISM system. Therefore, the LTE band 40 and the ISM WLAN system are interference systems for each other, and the LTE band 40 and the ISM BT are interference systems for each other.

In this embodiment, that the LTE band 13 is the interference system of the GPS system is taken as an example for description. This embodiment is also applicable to a case where the LTE band 14 is the interference system of the GPS system, which is not described separately.

S120. The UE notifies a base station of the judgment result.

The UE may notify a base station that is providing a service for the UE in the LTE system of the judgment result.

Optionally, the UE sends a first indication indicating that interference exists to the base station. For example, the first indication occupies 1-bit. When the bit information is 1, it indicates that interference exists; when the bit information is 0, it indicates that no interference exists. Division and application of a spectrum in each area are relatively stable, and a current working frequency band of the LTE system is knowable for the base station. Therefore, if the first indication indicating that interference exists is received, the base station is capable of determining a frequency band that interferes with the current working frequency band of the LTE system and is further capable of determining an interference system according to correspondence between a frequency band and a system. For example, the working frequency band of LTE is the band 13 or the band 14, that is, the UE works on the band 13 or the band 14. In this case, when receiving the first indication indicating that interference exists, the base station may determine that the interfered system is the GPS system.

Optionally, the first indication is carried in a radio resource control (Radio Resource Control, RRC) message sent by the UE to the base station, for example, it is implemented by occupying a backup field or an extension field of an existing user equipment information response (UEInformationResponse) message or adding an RRC message.

S130. The UE sends scheduling information of the interfered system (namely, the GPS system) to the base station.

The scheduling information in this step may be carried in the same message as the first indication sent by the UE in S120 (in this case, this step and S120 are implemented at the same time), and may also be carried in a message, such as the RRC message, which is sent by the UE to the base station before or after S120.

Figure 2:
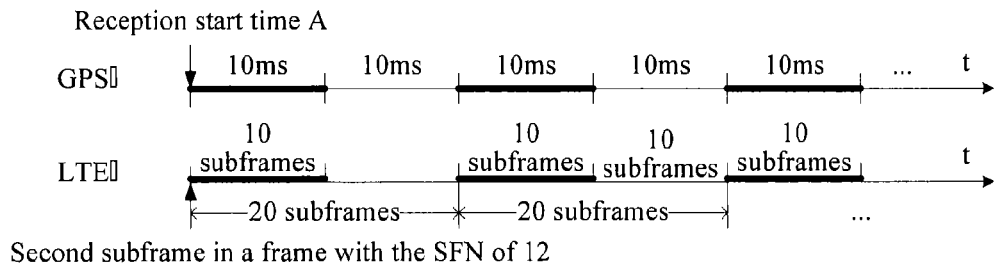
FIG. 2 is a schematic diagram of scheduling information according to an embodiment of the present invention.

When the interfered system is the scheduling-based GPS system, the UE may obtain scheduling information sent by the system. For example, the GPS system uses a C/A code as a ranging code. As shown in FIG. 2, a reception start time of the C/A code of the GPS system is A, a reception interval of the C/A code is 10 ms (as shown by fine lines on the time axis of the GPS system in FIG. 2), and a reception duration of the C/A code is 10 ms (as shown by bold lines on the time axis of the GPS system in FIG. 2). One frame in the LTE system includes 10 subframes, and a duration of each subframe is 1 ms. Optionally, when time references of the GPS system and the LTE (such as the band 13) system are different, the UE converts scheduling information using the time (in the form of the ranging code) of the GPS system as a reference to scheduling information using the time (in forms of the frame and the subframe) of the LTE system as the reference, so that the base station in the LTE system is capable of understanding the scheduling information of the GPS system. As shown in FIG. 2, the UE may convert the reception start time of the C/A code of the GPS system to a time of the LTE system. For example, a time A of the GPS system corresponds to the second subframe in a frame with the sequence number of 12 in the LTE system; the reception interval of the C/A code being 10 ms and the reception duration of the C/A code being 10 ms are converted to a reception period being 20 ms and a reception duration in each period being 10 ms in the LTE system (as shown by bold lines on the time axis of the LTE in FIG. 2). In other words, the scheduling information sent by the UE to the base station in the LTE system is: 20 (the reception period in the unit of ms or subframe), 12 and 2 (the wireless frame number SFN and the subframe number of the reception start time), and 10 (the reception duration in each period in the unit of ms or subframe). Optionally, when time references of the GPS system and the LTE (such as band 13) system are different, the UE converts scheduling information using the time of the GPS system as a reference to scheduling information using absolute time as the reference, so that the base station in the LTE system is capable of understanding the scheduling information of the GPS system. Optionally, when the scheduling information of the GPS system is scheduling information using absolute time as a reference, the UE directly sends the scheduling information of the GPS system to the base station in the LTE system, thereby reducing operations of the UE, or converts the scheduling information using the absolute time as the reference to scheduling information using the time of the LTE system as the reference, thereby reducing operations required for the base station to receive the scheduling information sent by the UE. The absolute time may also be called public time and is a time reference shared by each system. For example, the forms of year/month/day and hour/minute/second are adopted. Optionally, the time used as the reference is stipulated in a system standard.

S140. The base station generates temporary scheduling information and sends the temporary scheduling information to the UE, where scheduling that is indicated by the temporary scheduling information does not conflict with scheduling performed by the GPS system on the UE.

Optionally, the temporary scheduling information is carried in the RRC message sent by the base station to the UE.

Optionally, the temporary scheduling information indicates moments at which the base station does not schedule the UE, so that the UE uses another system at the moments. For example, the temporary scheduling information includes a scheduling period, a start time at which the base station does not schedule the UE in a scheduling period (which may be called a start time of stopping scheduling the UE for short), and a duration in which the base station does not schedule the UE in a scheduling period (which may be called a duration of stopping scheduling the UE for short). In a scheduling period, the base station may schedule the UE at a time beyond the duration of stopping scheduling the UE. For another example, the temporary scheduling information includes a scheduling period, a start time at which the base station does not schedule the UE in a scheduling period (which may be called a start time of stopping scheduling the UE for short), and an end time at which the base station does not schedule the UE in a scheduling period (which may be called an end time of stopping scheduling the UE for short).

Optionally, the temporary scheduling information does not directly indicate the moments at which the base station does not schedule the UE but instead indicates moments at which the base station schedules the UE. This also facilitates the UE in determining the moments at which the base station does not schedule the UE and using another system at the moments in a scheduling period. For example, the temporary scheduling information includes a scheduling period, a start time at which the base station schedules the UE in a scheduling period, and a duration in which the base station schedules the UE in a scheduling period. For another example, the temporary scheduling information includes a scheduling period, and a start time and an end time at which the base station schedules the UE in a scheduling period.

It should be noted that the reason why the same function is implemented no matter the base station indicates, for the UE, the moments at which the UE is scheduled or the moments at which the UE is not scheduled is that: a scheduling period may be divided into a time segment (a first time segment for short) in which the base station may schedule the UE or is allowed to schedule the UE and a time segment (a second time segment for short) in which the base station may not or is forbidden to schedule the UE. Therefore, as long as the base station is capable of indicating any two of the star time, end time, and duration of the first time segment, or any two of the start time, end time, and duration of the second time segment, the UE is capable of distinguishing a time (namely, the second time segment) in which the base station does not schedule the UE and a time (namely, the first time segment) in which the base station may schedule the UE. Therefore, although the temporary scheduling information including a scheduling period, a start time at which the base station stops scheduling the UE in a scheduling period, and a duration in which the base station stops scheduling the UE in a scheduling period is taken as an example in the embodiments of the present invention, it does not mean that the temporary scheduling information is limited hereto.

The base station may learn that the GPS system is the interfered system and how the GPS system schedules the UE according to the received first indication and the scheduling information sent by the UE. Certainly, the base station may also consider the scheduling information sent by the UE as a recommendation, of the UE, about how to receive data from the GPS system. Optionally, the base station generates the temporary scheduling information by modifying the scheduling information sent by the UE. For example, the base station modifies, according to a current service condition of the UE and/or a current resource scheduling condition of the base station, the scheduling information sent by the UE, and then sends the modified scheduling information to the UE as the temporary scheduling information. It should be noted that the expression "A and/or B" in the embodiments of the present invention is used for ease of description, which includes the following three cases: (1) A; (2) B; or (3) A and B.

For example, the current service condition of the UE is that a VoIP service is used. The base station performs semi-persistent scheduling on the UE. Assume that each 20 ms is a period. The UE receives or sends VoIP service data once in a specified subframe in each period. The specified subframe overlaps a time segment (where a reception start time is the second subframe in a frame with the SFN of 12 and a reception duration is 10 ms) in which the UE may receive data from the GPS system according to the scheduling information of the GPS system. That is, scheduling performed by the base station on the UE conflicts with scheduling performed by the GPS system on the UE. According to the semi-persistent scheduling currently performed by the base station on the UE, the UE should send or receive data of the LTE system at a certain moment corresponding to the specified subframe in the LTE system. According to the scheduling information of the GPS system sent by the UE, the UE should receive data from the GPS system and cannot send or receive data of the LTE system in the specified subframe. Therefore, the base station needs to modify the scheduling information sent by the UE or reconfigure the semi-persistent scheduling being performed on the UE. For example, the base station modifies the start time of stopping scheduling the UE in the scheduling information sent by the UE from "SFN being 12" to "SFN being 13". That is, the temporary scheduling to be performed by the base station on the UE includes: stopping scheduling the UE on 10 consecutive subframes (that is, 10 ms) by starting from the second subframe in a frame with the SFN of 13, where a scheduling period is 20 ms (equivalent to that the interval between two time segments in which the UE is not scheduled is 10 ms), thereby staggering the semi-persistent scheduling performed by the base station on the UE from the scheduling performed by the GPS system on the UE. Further, the temporary scheduling information sent by the base station to the UE may be 20 (the scheduling period in the unit of ms or subframe), 13 and 2 (the SFN and the subframe number of the start time of stopping scheduling the UE), and 10 (the duration, in which the UE is not scheduled in each period, in the unit of ms or subframe). The start time at which the UE may be scheduled is "SFN being 12" in the scheduling information sent by the base station to the UE. That is, the temporary scheduling to be performed by the base station on the UE includes the following: The UE may be scheduled on 10 consecutive subframes (that is, 10 ms) by starting from the second subframe in the frame with the SFN of 12, where a scheduling period is 20 ms (equivalent to that the interval between two time segments in which the UE may be scheduled is 10 ms), thereby staggering the semi-persistent scheduling performed by the base station on the UE from the scheduling performed by the GPS system on the UE. Further, the temporary scheduling information sent by the base station to the UE may be 20 (the scheduling period in the unit of ms or subframe), 12 and 2 (the SFN and the subframe number of the start time at which the UE may be scheduled), and 10 (the duration, in which the UE may be scheduled in each period, in the unit of ms or subframe).

For another example, a condition of resource scheduling currently performed by the base station on other UEs that are controlled by it is that temporary scheduling being performed by the base station on some other UEs (for example, scheduling on these UEs according to certain temporary scheduling information due to interference between systems) is consistent with the scheduling that is sent by the UE to the base station and to be performed by the GPS system on the UE. If the base station does not perform adjustment, it may cause that the base station does not schedule any UE in a certain period of time or the number of schedulable UEs decrease significantly. In this case, resources in this period of time are not used or the utilization is extremely low, resulting in a waste of resources. Therefore, the base station may stagger temporary scheduling on different UEs with respect to the time. For example, in the temporary scheduling information generated by the base station for different UEs, start times of stopping scheduling the UEs are different. In this way, the waste of resources is avoided and utilization of cell resources is maximized.

For another example, the base station first modifies (a first modification for short), according to the current service condition of the UE, the scheduling information sent by the UE, then modifies (a second modification for short), according to the current resource scheduling condition of the base station, the scheduling information on which the first modification is performed, and sends the scheduling information on which the second modification is performed to the UE as the temporary scheduling information.

S150. The base station schedules the UE according to the temporary scheduling information.

The UE may receive data of the GPS system in a time segment in which the base station does not schedule the UE, where the time segment is indicated by the temporary scheduling information. For example, the UE receives the data of the GPS system on 10 consecutive subframes by starting from the second subframe in the frame with the SFN of 13, for example, receiving a ranging code such as a C/A code or a P code of the GPS system or a navigation message of the GPS system. The UE uses 20 ms as a period to receive the data of the GPS system.

Optionally, if the GPS system is disabled or stops to be used, the UE may send a first indication indicating that no interference exists to the base station (S160). In this case, the base station may stop using the temporary scheduling information and notify the UE that the temporary scheduling information is invalid (S170). For example, the base station schedules the UE by using the prior art instead without being affected by scheduling that is performed by another system on the UE.

Optionally, the base station in this embodiment is a base station that is providing a service for the UE in the LTE system. If the UE switches over from the base station to a target base station, the base station may send the first indication and the scheduling information of the GPS system that are sent by the UE to the target base station, so that the target base station learns that an interference system exists and may generate temporary scheduling information for the UE.

In this embodiment, a base station in an LTE system generates temporary scheduling information according to information sent by a UE. This may avoid a conflict between scheduling performed by the LTE system on the UE and scheduling performed by another system (such as a GPS system) on an adjacent frequency band on the UE, and solve the problem of mutual interference in message reception and transmission that are performed by the UE in two systems on adjacent frequency bands.

Figure 3:
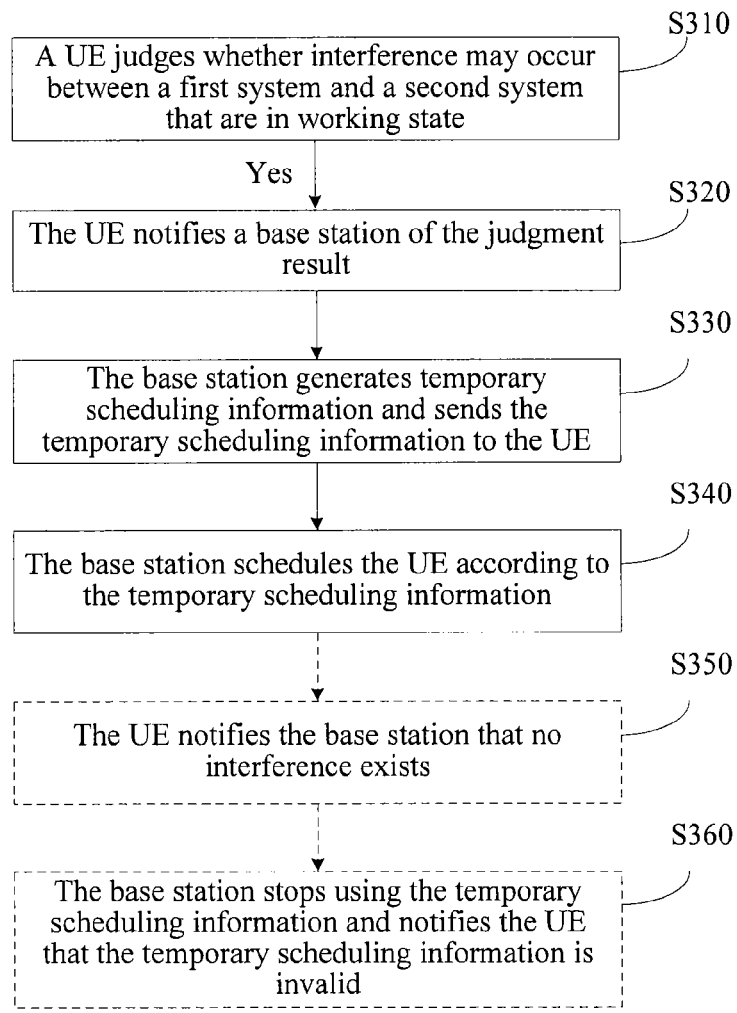
FIG. 3 is a schematic diagram of a scheduling method according to another embodiment of the present invention.

As shown in FIG. 3, another embodiment of the present invention provides a method. The method includes the following steps:

S310 is similar to S110. The difference lies in that in this embodiment, that an LTE band 40 and an ISM WLAN system are interference systems for each other is taken as an example for description. This embodiment is also applicable to a case where the LTE band 40 and an ISM BT are interference systems for each other, which is not described separately.

S320 is similar to S120. The difference lies in that a case where an LTE band 40 and an ISM system are interference systems for each other includes: a case where the LTE band 40 and the ISM WLAN system are interference systems for each other and a case where the LTE band 40 and the ISM BT are interference systems for each other. Therefore, if the UE determines that interference exists between the ISM WLAN system and the LTE band 40 or between the ISM BT and the LTE band 40, the UE may further send a second indication to the base station in addition to the first indication in this step, where the second indication is used to indicate the ISM WLAN system or the ISM BT between which and the LTE system interference exists. For example, the second indication occupies 1-bit. When the bit information is 1, it indicates that the interference system is the ISM WLAN system; when the bit information is 0, it indicates that the interference system is the ISM BT.

Optionally, the second indication is carried in the same message as the first indication, thereby reducing occupation of air interface resources.

S330. The base station generates temporary scheduling information and sends the temporary scheduling information to the UE, where the temporary scheduling information indicates moments at which the base station does not schedule the UE, so that the UE uses another system at the moments. For example, the temporary scheduling information includes a scheduling period, a start time at which the base station does not schedule the UE in a scheduling period (which may be called a start time of stopping scheduling the UE for short), and a duration in which the base station does not schedule the UE in a scheduling period (which may be called a duration of stopping scheduling the UE for short). For another example, the temporary scheduling information includes a scheduling period, a start time at which the base station does not schedule the UE in a scheduling period (which may be called a start time of stopping scheduling the UE for short), and an end time at which the base station does not schedule the LTE in a scheduling period (which may be called an end time of stopping scheduling the UE for short). For another example, the temporary scheduling information includes a scheduling period, a start time at which the base station schedules the UE in a scheduling period, and a duration in which the base station schedules the UE in a scheduling period. For another example, the temporary scheduling information includes a scheduling period, and a start time and an end time at which the base station schedules the UE in a scheduling period.

Optionally, the temporary scheduling information is carried in the RRC message sent by the base station to the LTE.

When the interference system is the competition-based ISM WLAN system, no scheduling information of the system exists. Optionally, the UE may generate recommended scheduling information and send it to the base station, where the recommended scheduling information indicates a manner expected by the UE for the base station to schedule the UE, so that in a time segment without scheduling by the base station, the UE is capable of using the ISM WLAN system, that is, communicating with the ISM WLAN system, including uplink or downlink data transmission and signaling interaction. Optionally, the UE generates recommended scheduling information according to a service use condition of the UE in the LTE system and a service use condition of the UE in another system to recommend a time segment in which the base station allows the UE to receive data from the ISM WLAN system. For example, when the UE uses the WLAN system to make an IP network telephony (such as skype) call and uses the LTE system to download data, the UE may recommend that the base station periodically stop scheduling the UE, so as to ensure quality of the IP network telephony call, that is, to periodically send and receive IP network telephony data. In this way, the UE uses the IP network telephony call service of the WLAN system at a moment at which the base station does not schedule the UE. For example, the scheduling recommended by the UE for the base station is as follows: The base station does not schedule the UE on 5 consecutive subframes (that is, 5 ms) by starting from the sixth subframe in a frame with the SFN of 15, where a scheduling period is 100 ms (equivalent to that an interval between two time segments in which the UE is not scheduled is 50 ms). Further, the recommended scheduling information sent by the UE to the base station may be: 100 (the scheduling period in the unit of ms or subframe), 15 and 6 (the SFN and the subframe number of the start time of stopping scheduling the UE), and 5 (the duration, in which the UE is not scheduled in each period, in the unit of ms or subframe).

If the UE sends the recommended scheduling information to the base station, the base station may learn, according to the received first indication, second indication, and recommended scheduling information, that the ISM WLAN system is an interference system and the manner recommended by the UE for the base station to schedule the UE. Optionally, the base station generates the temporary scheduling information by modifying the scheduling information sent by the UE. For example, the base station modifies, according to a current service condition of the UE and/or a resource scheduling condition of the base station, the recommended scheduling information sent by the UE, and then sends the modified scheduling information to the UE as the temporary scheduling information.

For example, the current service condition of the UE is that a VoIP service is used. The base station performs semi-persistent scheduling on the UE. Assume that each 20 ms is a period. The UE receives or sends VoIP service data once in a specified subframe in each period. The specified subframe overlaps a time segment (where a reception start time is the sixth subframe in the frame with the SFN of 15 and a reception duration is 5 ms) in which data from the ISM WLAN system is received, where the time segment is recommended by the UE. Therefore, the base station needs to modify the recommended scheduling information sent by the UE or reconfigure the semi-persistent scheduling being performed on the UE. For example, the base station modifies the start time of stopping scheduling the UE recommended by the UE from "SFN being 15" to "SFN being 16". That is, the temporary scheduling to be performed by the base station on the UE includes: stopping scheduling the UE on 5 consecutive subframes (that is, 5 ms) by starting from the sixth subframe in a frame with the SFN of 16, where the scheduling period is 100 ms (equivalent to that the interval between two time segments in which the UE is not scheduled is 50 ms), thereby staggering the time segment in which the semi-persistent scheduling is performed by the base station on the UE from a time segment in which the UE receives data from the ISM WLAN system. Further, the temporary scheduling information sent by the base station to the UE may be 100 (the scheduling period in the unit of ms or subframe), 16 and 6 (the SFN and the subframe number of the start time of stopping scheduling the UE), and 5 (the duration, in which the UE is not scheduled in each period, in the unit of ms or subframe).

For another example, a current resource scheduling condition of the base station is that temporary scheduling being performed by the base station on some other UEs (for example, scheduling on these UEs according to certain temporary scheduling information due to interference between systems) is consistent with the recommended scheduling information sent by the UE to the base station. If the base station does not perform adjustment, it may cause that the base station does not schedule any UE in a certain period of time or the number of schedulable UEs decrease significantly. In this case, resources in this period of time are not used or the utilization is extremely low, resulting in a waste of resources. Assume that the UE in this embodiment is a UE 11 and the base station is performing temporary scheduling on other 10 UEs (namely, a UE 1 to a UE 10). The temporary scheduling performed by the base station on the UE 1 is as follows: A start time of stopping scheduling the UE 1 is the sixth subframe in a frame with the SFN of 1, a duration is 5 ms, and a scheduling period is 30 ms. The temporary scheduling performed by the base station on a UE 2 is as follows: A start time of stopping scheduling the UE 2 is the sixth subframe in a frame with the SFN of 31, a duration is 5 ms, and a scheduling period is 30 ms. . . . The temporary scheduling performed by the base station on the UE 10 is as follows: A start time of stopping scheduling the UE 10 is the sixth subframe in a frame with the SFN of 271, a duration is 5 ms, and a scheduling period is 30 ms. If a time segment, of receiving data of the ISM WLAN system, recommended by all other UEs is as follows: a reception start time is the sixth subframe in the frame with the SFN of 31, a reception duration is 5 ms, and a period is 30 ms, that is, the UEs recommend that the base station stop scheduling the UEs in this time segment, a case where multiple UEs cannot be scheduled on a same position may exist. To avoid a waste of resources such as the waste of resources due to that the sixth subframe in the frame with the SFN of 31 and subsequent 5 ms are not used by any UE, the base station may perform discrete distribution for other UEs. For example, the following temporary scheduling is performed for the UE 11: The base station does not schedule the UE 11 on 5 consecutive subframes (that is 5 ms) by starting from the sixth subframe in a frame with the SFN of 301, where a scheduling period is 30 ms; accordingly, the base station modifies the recommended scheduling information sent by the UE, where the generated temporary scheduling information is: 30 (the scheduling period in the unit of ms or subframe), 301 and 6 (the SFN and the subframe number of the start time of stopping scheduling the UE), and 5 (the duration, in which the UE is not scheduled in each period, in the unit of ms or subframe).

Optionally, if the UE does not generate or send the recommended scheduling information to the base station, the base station may generate the temporary scheduling information after learning, according to the first indication and the second indication, that the ISM WLAN system is the interference system. For example, the temporary scheduling information is generated for the UE according to the current service condition of the UE and/or the resource scheduling condition of the base station.

For example, the current service condition of the UE is that a VoIP service is used. The base station performs semi-persistent scheduling on the UE. Assume that each 20 ms is a period. The UE receives or sends VoIP service data once in a specified subframe in each period. The base station may try to avoid an impact on a semi-persistent scheduling period. Therefore, the base station may try to stagger the temporary scheduling period from the semi-persistent scheduling period. For example, the start time of the current semi-persistent scheduling period is the second subframe in the frame with the SFN of 15, the period is 20 ms, and a duration in which the UE is allowed to receive and send data is 1 ms. Temporary scheduling that may be performed by the base station on the UE includes: stopping scheduling the UE on 5 consecutive subframes (that is, 5 ms) by starting from the sixth subframe in the frame with the SFN of 16, where a scheduling period is 100 ms, equivalent to that the interval between two time segments in which the UE is not scheduled is 50 ms. In this way, the temporary scheduling performed by the base station on the UE is staggered from the semi-persistent scheduling currently performed on the UE. Further, the temporary scheduling information sent by the base station to the UE may be 100 (the scheduling period in the unit of ms or subframe), 16 and 6 (the SFN and the subframe number of the start time of stopping scheduling the UE), and 5 (the duration, in which the UE is not scheduled in each period, in the unit of ms or subframe).

For another example, the current resource scheduling condition of the base station is that the base station is performing temporary scheduling on some other UEs. Assume that the UE in this embodiment is a UE 11 and the base station is performing temporary scheduling on other 10 UEs (namely, a UE 1 to a UE 10). The temporary scheduling performed by the base station on the UE 1 is as follows: A start time of stopping scheduling the UE 1 is the sixth subframe in the frame with the SFN of 1, a duration is 5 ms, and a scheduling period is 30 ms. The temporary scheduling performed by the base station on a UE 2 is as follows: A start time of stopping scheduling the UE 2 is the sixth subframe in the frame with the SFN of 2, a duration is 5 ms, and a scheduling period is 30 ms. . . . The temporary scheduling performed by the base station on the UE 10 is as follows: A start time of stopping scheduling the UE N is the sixth subframe in the frame with the SFN of 271, a duration is 5 ms, and a scheduling period is 30 ms. If the same interference exists on other UEs and the base station repeatedly allocates the same temporary scheduling for the UEs, it definitely causes that only a small number of UEs can be scheduled in a certain temporary scheduling period. To avoid a waste of resources such as the waste of resources due to that the sixth subframe in the frame with the SFN of 271 and subsequent 5 ms are repeatedly allocated and therefore not used by any UE, the base station may perform discrete distribution for other UEs. For example, the following temporary scheduling is performed for the UE 11: The base station does not schedule the UE 11 on 5 consecutive subframes (that is 5 ms) by starting from the sixth subframe in the frame with the SFN of 301, where a scheduling period is 30 ms. Accordingly, the temporary scheduling information generated by the base station is: 30 (the scheduling period in the unit of ms or subframe), 11 and 6 (the SFN and the subframe number of the start time of stopping scheduling the UE), and 5 (the duration, in which the UE is not scheduled in each period, in the unit of ms or subframe).

For another example, the temporary scheduling to be performed by the base station on the UE is as follows: The base station does not schedule the UE on 5 consecutive subframes (that is, 5 ms) by starting from the second subframe in the frame with the SFN of 12, where a scheduling period is 100 ms (equivalent to that the interval between two time segments in which the UE is not scheduled is 50 ms). For another example, the temporary scheduling information is 100 (the scheduling period in the unit of ms or subframe), 12 and 8 (the SFN and the subframe number of the start time of stopping scheduling the UE), and 5 (the duration, in which the UE is not scheduled in each period, in the unit of ms or subframe).

For another example, the current service condition of the UE is that semi-persistent scheduling is not used to receive a service, and the resource scheduling condition of the base station is that temporary scheduling is not performed on other UEs under the base station. In this case, the base station may preferably use the recommended scheduling information sent by the UE. If the base station receives no recommended scheduling information, temporary scheduling information may be generated randomly and the UE is instructed to send or receive data of another system in a time segment in which the base station does not schedule the UE, where the time segment is indicated by the temporary scheduling information.

For another example, the base station first modifies (a first modification for short), according to the current service condition of the UE, the scheduling information sent by the UE, then modifies (a second modification for short), according to the current resource scheduling condition of the base station, the scheduling information on which the first modification is performed, and sends the scheduling information on which the second modification is performed to the UE as the temporary scheduling information.

S340. The base station schedules the UE according to the temporary scheduling information.

The UE may perform uplink or downlink communication with the ISM WLAN system, including data upload and download, signaling interaction, and the like, in the time segment in which the base station does not schedule the UE, where the time segment is indicated by the temporary scheduling information.

Optionally, if the ISM WLAN system is disabled, the UE may send a first indication indicating that no interference exists to the base station (S350). In this case, the base station may stop using the temporary scheduling information and notify the UE that the temporary scheduling information is invalid (S360). For example, the base station schedules the UE by using the prior art instead without being affected by scheduling that is performed by another system on the UE.

Optionally, the base station in this embodiment is a base station that is providing a service for the UE in the LTE system. If the UE switches over from the base station to a target base station, the base station may send the first indication and the second indication that are sent by the UE to the target base station, so that the target base station learns that an interference system exists and may generate temporary scheduling information for the UE.

In this embodiment, a base station in an LTE system generates temporary scheduling information according to information sent by a UE. This may avoid a conflict between scheduling performed by the LTE system on the UE and scheduling performed by another system (such as an ISM system) on an adjacent frequency band on the UE, and solve the problem of mutual interference in message reception and transmission that are performed by the UE in two systems on adjacent frequency bands.

Another embodiment of the present invention provides a method. The difference between this method and the method according to the embodiment shown in FIG. 3 lies in that a UE generates recommended scheduling information and sends it to a base station; the base station sends an acknowledgment message to the UE to acknowledge that the recommended scheduling information is received; and then the base station schedules the UE according to the recommended scheduling information. That is to say, the base station receives a recommendation of the UE about how the base station schedules the UE and does not need to generate temporary scheduling information. It may also be considered that the base station takes the recommended scheduling information sent by the UE as the temporary scheduling information. Optionally, the acknowledgment message sent by the base station to the UE on the recommended scheduling information may be an ACK message or another message including an acknowledgment field. The acknowledgment message may acknowledge correct reception of a first indication and the recommended scheduling information at the same time.

In this embodiment, mutual interference in message reception and transmission that are performed by a UE in systems on adjacent frequency bands can be avoided, internal operations, such as operations for generating temporary scheduling information, of a base station in an LTE system can be reduced, and the UE is facilitated in coordinating use of different systems.

Figure 4:
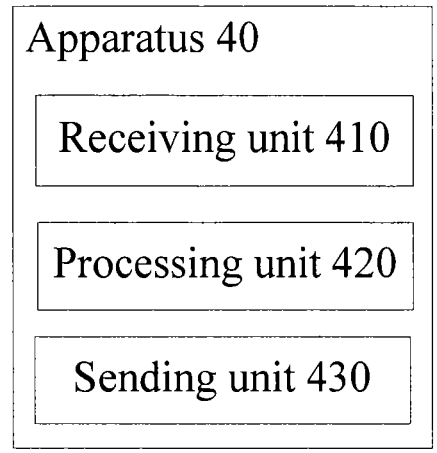
FIG. 4 is a schematic diagram of a device according to another embodiment of the present invention.

As shown in FIG. 4, another embodiment of the present invention provides an apparatus 40. The apparatus 40 may be configured to implement actions completed by a base station in a scheduling method according to other embodiments of the present invention. For example, the apparatus 40 is located in a first system and includes a receiving unit 410, a processing unit 420, and a sending unit 430. The receiving unit 410 is configured to receive a first indication sent by a UE, where the first indication indicates that interference exists between the first system and a second system. The processing unit 420 is configured to generate temporary scheduling information and schedule the UE according to the temporary scheduling information. The sending unit 430 is configured to send the temporary scheduling information to the UE. The time at which the processing unit 420 schedules the UE according to the temporary scheduling information does not overlap the time at which the UE receives data from the second system.

Optionally, the first system is an LTE system and the apparatus is a device that provides a service for the UE, for example, a base station that is providing a service for the UE in the LTE system.

Taking that the first system is an LIE band 40 and the second system is an ISM WLAN system or an ISM BT system as an example, the processing unit 420 is specifically configured to generate the temporary scheduling information according to a current service condition of the UE and/or a current resource scheduling condition of the base station (for example, a condition of resource scheduling for other UEs controlled by the base station). Alternatively, the receiving unit 410 is further configured to receive recommended scheduling information sent by the UE. The processing unit 420 is specifically configured to modify the recommended scheduling information according to a current service condition of the UE and/or a current resource scheduling condition of the base station (for example, a condition of resource scheduling for other UEs controlled by the base station), where the modified scheduling information is the temporary scheduling information, and the recommended scheduling information indicates a manner recommended by the UE for the base station to schedule the UE. Optionally, the processing unit is further configured to send the first indication to a target base station before the UE switches over to the target base station, where the target base station is located in the first system.

Taking that the first system is an LTE band 13 or an LTE band 14 and the second system is a GPS system as an example, the receiving unit 410 is further configured to receive scheduling information, of the second system, sent by the UE, where the scheduling information of the second system is used for the second system to schedule the UE. The processing unit 420 is specifically configured to generate temporary scheduling information according to the scheduling information of the second system. It should be noted that the time at which the processing unit 420 schedules the UE according to the temporary scheduling information does not overlap the time at which the UE receives data from the second system. It may also be understood that the time at which the processing unit 420 schedules the UE according to the temporary scheduling information does not overlap the time at which the second system schedules the UE according to the scheduling information of the second system. Optionally, the scheduling information of the second system and the first indication are carried in a same RRC message; or the receiving unit 410 is further configured to receive a second indication indicating a type of the second system, where the scheduling information of the second system, the first indication, and the second indication are carried in a same radio resource control RRC message. Accordingly, after receiving the temporary scheduling information sent by the sending unit 430, the UE accepts scheduling performed by the second system according to the scheduling information of the second system, for example, receiving data of the second system, in a time segment in which the base station does not schedule the UE. For example, the generating, by the processing unit 420, the temporary scheduling information according to the scheduling information of the second system includes: modifying, according to a current service condition of the UE and/or a current resource scheduling condition of the base station, the scheduling information sent by the UE, and taking the modified scheduling information as the temporary scheduling information. Optionally, the scheduling information of the second system is scheduling information that is generated through conversion by the UE and uses the time of the first system as a reference, where the conversion includes converting the scheduling information from that using the time of the second system as the reference to that using the time of the first system as the reference. Optionally, the sending unit 430 is further configured to send the first indication and the scheduling information of the second system to a target base station before the UE switches over to the target base station, where the target base station is located in the first system.

Optionally, the receiving unit 410 is further configured to receive a first indication indicating that no interference exists between the first system and the second system. Accordingly, the processing unit 420 is further configured to stop scheduling the UE according to the temporary scheduling information. Further, the processing unit 420 is further configured to notify the UE that the temporary scheduling information is invalid.

Optionally, the temporary scheduling information in this embodiment includes: a scheduling period, a start time at which the base station does not schedule the UE in a scheduling period, and a duration in which the base station does not schedule the UE in a scheduling period; or a scheduling period, and a start time and an end time at which the base station does not schedule the UE in a scheduling period.

Mutual interference in message reception and transmission that are performed by a UE in systems on adjacent frequency bands can be avoided by using the apparatus provided in this embodiment.

Figure 5:
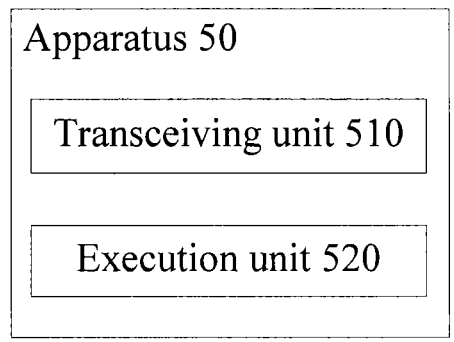
FIG. 5 is a schematic diagram of a device according to another embodiment of the present invention.

As shown in FIG. 5, another embodiment of the present invention provides an apparatus 50. The apparatus 50 may be configured to implement actions completed by a UE in a scheduling method according to other embodiments of the present invention. For example, the apparatus 50 includes a transceiving unit 510 and an execution unit 520. The transceiving unit 510 is configured to send a first indication and recommended scheduling information to a base station in a first system, where the first indication indicates that interference exists between the first system and a second system. The transceiving unit 510 is further configured to receive an acknowledgment message sent by the base station. The execution unit 520 is configured to accept, according to the recommended scheduling information, scheduling by the base station, and receive data of the second system in a time segment in which the base station does not schedule the UE. The acknowledgment message indicates an acknowledgment for the first indication and the recommended scheduling information, for example, an acknowledgment of correct reception and/or recommendation acceptance.

Taking that the first system is an LTE band 40 system and the second system is an ISM WLAN system or an ISM BT system as an example, the execution unit 520 is further configured to judge, before the transceiving unit 510 sends the first indication to the base station in the first system, whether interference exists between the first system and the second system, and trigger the transceiving unit 510 to send the first indication to the base station if interference exists between the first system and the second system. Optionally, the transceiving unit 510 is further configured to: when learning from the base station that the temporary scheduling information is invalid, trigger the execution unit 520 to stop accepting, according to the temporary scheduling information, scheduling by the base station. Optionally, the execution unit 520 is further configured to: when determining that no interference exists between the first system and the second system, trigger the transceiving unit 510 to notify the base station that no interference exists between the first system and the second system.

Optionally, the temporary scheduling information in this embodiment includes: a scheduling period, a start time at which the base station does not schedule the UE in a scheduling period, and a duration in which the base station does not schedule the UE in a scheduling period; or a scheduling period, and a start time and an end time at which the base station does not schedule the UE in a scheduling period.

No mutual interference exists in message reception and transmission that are performed by the apparatus provided in this embodiment in systems on adjacent frequency bands.

Persons of ordinary skill in the art should understand that all or a part of the steps of the methods in the embodiments may be implemented by a program instructing relevant hardware. The program may be stored in a computer readable storage medium, and the storage medium may be a ROM/RAM, a magnetic disk, a compact disk, and so on.

For example, the program may run according to the following steps: A base station in a first system receives a first indication sent by a user equipment UE, where the first indication indicates that interference exists between the first system and a second system; the base station generates temporary scheduling information and sends the temporary scheduling information to the UE; and the base station schedules the UE according to the temporary scheduling information, where the time at which the base station schedules the UE according to the temporary scheduling information does not overlap the time at which the UE receives data from the second system. The program instructs the base station or partial hardware in the base station to complete the steps, which may avoid mutual interference in message reception and transmission that are performed by the UE in systems on adjacent frequency bands.

For another example, the program may run according to the following steps: Send a first indication and recommended scheduling information to a base station in a first system, where the first indication indicates that interference exists between the first system and the second system; a UE receives an acknowledgment message sent by the base station; the UE accepts, according to the recommended scheduling information, scheduling by the base station, and receives data of the second system in a time segment in which the base station does not schedule the UE. The program instructs the UE or partial hardware in the UE to complete the steps, which may avoid mutual interference in message reception and transmission that are performed by the UE in systems on adjacent frequency bands.

It should be noted that the foregoing descriptions are merely exemplary embodiments of the present invention, and persons of ordinary skill in the art may make various improvements and refinements without departing from the principle of the invention. All such improvements and refinements are intended to be covered by the present invention.

What is claimed is:
1. A scheduling method, comprising:
receiving, by a base station in a first system, a first indication and recommended scheduling information sent by a user equipment (UE), wherein the first indication indicates that interference exists between the first system and a second system, and the recommended scheduling information indicates a manner recommended by the UE for the base station to schedule the UE;
generating, by the base station, temporary scheduling information by modifying the recommended scheduling information according to a current service condition of the UE, wherein the current service condition of the UE is that semi-persistent scheduling is used or not to receive a service;
sending, by the base station, the temporary scheduling information to the UE; and scheduling, by the base station, the UE according to the temporary scheduling information, wherein the time at which the base station schedules the UE according to the temporary scheduling information does not overlap the time at which the UE receives data from the second system.

2. The method according to claim 1, further comprising:
sending, by the base station, the first indication to a target base station before the UE switches over to the target base station, wherein the target base station is located in the first system.

3. The method according to claim 1, wherein the first system is a Long Term Evolution (LTE) system that uses a frequency band with a sequence number of 40, and the second system is a wireless local area network (WLAN) system or a Bluetooth (BT) system that uses an industrial, scientific, and medical frequency band.

4. The method according to claim 1, wherein:
before the base station generates the temporary scheduling information, the method further comprises:
receiving, by the base station, scheduling information of the second system, sent by the UE;
the generating, by the base station, temporary scheduling information comprises:
generating, by the base station, temporary scheduling information according to the scheduling information of the second system; and
accepting, by the UE, in a time segment in which the base station does not schedule the UE, scheduling performed by the second system according to the scheduling information of the second system.

5. The method according to claim 4, wherein:
the scheduling information of the second system and the first indication are carried in a same radio resource control (RRC) message; or
the base station further receives a second indication indicating a type of the second system, wherein the scheduling information of the second system, the first indication, and the second indication are carried in a same radio resource control RRC message.

6. The method according to claim 1, further comprising:
judging, by the UE, whether interference exists between the first system and the second system; and
sending, by the UE, the first indication to the base station if interference exists between the first system and the second system.

7. The method according to claim 1, after the scheduling the UE according to the temporary scheduling information, further comprising:
stopping, by the base station, scheduling the UE according to the temporary scheduling information when learning that no interference exists between the first system and the second system.

8. The method according to claim 1, wherein the temporary scheduling information comprises:
a scheduling period, a start time at which the base station does not schedule the UE in a scheduling period, and a duration in which the base station does not schedule the UE in a scheduling period; or
a scheduling period, and a start time and an end time at which the base station does not schedule the UE in a scheduling period; or
a scheduling period, a start time at which the base station schedules the UE in a scheduling period, and a duration in which the base station schedules the UE in a scheduling period; or
a scheduling period, and a start time and an end time at which the base station schedules the UE in a scheduling period.

9. The method according to claim 1, wherein the modifying the recommended scheduling information further includes modifying the recommended scheduling information according to a current resource scheduling condition of the base station.

10. A scheduling method, comprising:
sending, by a user equipment (UE), a first indication and recommended scheduling information to a base station in a first system, wherein the first indication indicates that interference exists between the first system and a second system, and the recommended scheduling information indicates a manner recommended by the UE for the base station to schedule the UE;
receiving, by the UE, temporary scheduling information sent by the base station; and
accepting, by the UE, according to the temporary scheduling information, scheduling by the base station, and receiving data of the second system in a time segment in which the base station does not schedule the UE;
wherein the temporary scheduling information is generated by the base station by modifying the recommended scheduling information according to a current service condition of the UE, and the current service condition of the UE is that semi-persistent scheduling is used or not to receive a service.

11. The method according to claim 10, wherein the first system is a Long Term Evolution (LTE) system that uses a frequency band with a sequence number of 40, and the second system is a wireless local area network (WLAN) system or a Bluetooth (BT) system that uses an industrial, scientific, and medical frequency band.

12. The method according to claim 10, before the sending, by a UE, a first indication to a base station in a first system, further comprising:
judging, by the UE, whether interference exists between the first system and the second system; and
sending, by the UE, the first indication to the base station if interference exists between the first system and the second system.

13. The method according to claim 10, after the accepting, by the UE, according to the temporary scheduling information, scheduling by the base station, further comprising:
when learning from the base station that the temporary scheduling information is invalid, stopping, by the UE, accepting, according to the temporary scheduling information, scheduling by the base station.

14. The method according to claim 13, before the learning, by the UE, from the base station that the temporary scheduling information is invalid, further comprising:
when the UE determines that no interference exists between the first system and the second system, notifying, by the UE, the base station that no interference exists between the first system and the second system.

15. The method according to claim 10, wherein the temporary scheduling information comprises:
a scheduling period, a start time at which the base station does not schedule the UE in a scheduling period, and a duration in which the base station does not schedule the UE in a scheduling period; or
a scheduling period, and a start time and an end time at which the base station does not schedule the UE in a scheduling period; or a scheduling period, a start time at which the base station schedules the UE in a scheduling period, and a duration in which the base station schedules the UE in a scheduling period; or a scheduling period, and a start time and an end time at which the base station schedules the UE in a scheduling period.

16. The method according to claim 10, wherein the modifying the recommended scheduling information further includes modifying the recommended scheduling information according to a current resource scheduling condition of the base station.

17. An apparatus, located in a first system, comprising:
a receiving unit;
a processing unit; and
a sending unit, wherein:
the receiving unit is configured to receive a first indication and recommended scheduling information sent by a user equipment (UE), wherein the first indication indicates that interference exists between the first system and a second system, and the recommended scheduling information indicates a manner recommended by the UE for the apparatus to schedule the UE;
the processing unit is configured to generate temporary scheduling information by modifying the recommended scheduling information according to a current service condition of the UE, and schedule the UE according to the temporary scheduling information, wherein the current service condition of the UE is that semi-persistent scheduling is used or not to receive a service; and
the sending unit is configured to send the temporary scheduling information to the UE, wherein the time at which the processing unit schedules the UE according to the temporary scheduling information does not overlap the time at which the UE receives data from the second system.

18. The apparatus according to claim 17, wherein the processing unit is further configured to send the first indication to a target base station before the UE switches over to the target base station, where the target base station is located in the first system.

19. The apparatus according to claim 17, wherein the receiving unit is further configured to receive scheduling information, of the second system, sent by the UE, wherein the scheduling information of the second system is used for the second system to schedule the UE; and the processing unit is configured to generate temporary scheduling information according to the scheduling information of the second system.

20. The apparatus according to claim 17, wherein the receiving unit is further configured to receive a second indication indicating that no interference exists between the first system and the second system, and the processing unit is further configured to stop scheduling the UE according to the temporary scheduling information.

21. The apparatus according to claim 17, wherein the modifying the recommended scheduling information further includes modifying the recommended scheduling information according to a current resource scheduling condition of the base station.

* * * * *